United States Patent
Tsai et al.

(10) Patent No.: US 12,555,112 B2
(45) Date of Patent: Feb. 17, 2026

(54) WEARABLE AUTHENTICATION SYSTEM AND RING DEVICE

(71) Applicant: HTC Corporation, Taoyuan (TW)

(72) Inventors: Meng-Chi Tsai, Taoyuan (TW); Cheng-Han Hsieh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 543 days.

(21) Appl. No.: 18/169,222

(22) Filed: Feb. 15, 2023

(65) Prior Publication Data

US 2024/0029066 A1 Jan. 25, 2024

Related U.S. Application Data

(60) Provisional application No. 63/391,320, filed on Jul. 22, 2022.

(51) Int. Cl.
*G06Q 20/40* (2012.01)
*G06Q 20/32* (2012.01)
(Continued)

(52) U.S. Cl.
CPC ..... *G06Q 20/40145* (2013.01); *G06Q 20/321* (2020.05); *G06Q 20/3278* (2013.01);
(Continued)

(58) Field of Classification Search
CPC ........... G06Q 20/40145; G06Q 20/321; G06Q 20/3278; G06Q 30/0643; G06Q 20/123; G06Q 20/20; G06Q 20/327; G06V 40/1318; G06V 40/1365; G06V 40/145; G06V 40/15; H04N 23/23; G06F 1/163; G06F 1/1684; G06F 21/32; G06F 21/34
See application file for complete search history.

(56) References Cited

U.S. PATENT DOCUMENTS 9,711,060 B1 * 7/2017 Lusted ............... A61B 5/02416
9,942,222 B1 * 4/2018 Fenton ............... H04L 63/0853
(Continued)

FOREIGN PATENT DOCUMENTS

| CN | 206258819 | 6/2017 |
| CN | 114761905 | 7/2022 |
| TW | 201610756 | 3/2016 |

*Primary Examiner* — John B Strege
(74) *Attorney, Agent, or Firm* — JCIPRNET

(57) ABSTRACT

A wearable authentication system is provided. The wearable authentication system includes a head-mounted device and a ring device. The head-mounted device includes a first network module and a camera. The first network module sends an authentication request. The camera is configured to provide an image of a hand of a user. The ring device includes an inertial measurement unit, a second network module and a biometric sensor. The inertial measurement unit provides an inertial measurement value of the ring device. The second network module receives the authentication request. The biometric sensor gathers biometric information from the user based on the authentication request. The wearable authentication system tracks a position of the ring device based on at least one of the image and the inertial measurement value. The second network module sends authentication information based on the biometric information and the inertial measurement value to the first network module.

18 Claims, 8 Drawing Sheets

(51) Int. Cl.
  G06Q 30/0601 (2023.01)
  G06V 40/10 (2022.01)
  G06V 40/12 (2022.01)
  G06V 40/13 (2022.01)
  G06V 40/145 (2022.01)
  H04N 23/23 (2023.01)

(52) U.S. Cl.
  CPC ..... G06Q 30/0643 (2013.01); G06V 40/1318 (2022.01); G06V 40/1365 (2022.01); G06V 40/145 (2022.01); G06V 40/15 (2022.01); H04N 23/23 (2023.01)

(56) References Cited

U.S. PATENT DOCUMENTS

| | | | |
|---|---|---|---|
| 10,546,439 B2 * | 1/2020 | Williams | G06F 1/1677 |
| 11,262,808 B2 * | 3/2022 | Daube | G01C 19/00 |
| 2014/0279528 A1 * | 9/2014 | Slaby | G06F 1/163 |
| | | | 455/411 |
| 2016/0300211 A1 | 10/2016 | Brown et al. | |
| 2017/0055881 A1 * | 3/2017 | Kang | A61B 5/6823 |
| 2018/0211020 A1 * | 7/2018 | Fukuda | G06T 1/00 |
| 2019/0192053 A1 * | 6/2019 | Saigh | G16H 20/30 |
| 2020/0135182 A1 * | 4/2020 | Kahlon | G10L 15/22 |
| 2020/0342086 A1 * | 10/2020 | Oung | H04W 12/065 |
| 2022/0321557 A1 * | 10/2022 | Slensker | H04L 63/0861 |
| 2022/0409144 A1 * | 12/2022 | Priem | A61B 5/0205 |
| 2024/0008752 A1 * | 1/2024 | Shimuta | A61B 5/7425 |
| 2024/0338432 A1 * | 10/2024 | Sanchez | H04L 9/3247 |
| 2024/0366097 A1 * | 11/2024 | Shimuta | A61B 5/02028 |
| 2025/0021167 A1 * | 1/2025 | Mai | G06F 3/0346 |

* cited by examiner

WEARABLE AUTHENTICATION SYSTEM AND RING DEVICE

CROSS-REFERENCE TO RELATED APPLICATION

This application claims the priority benefit of U.S. provisional application Ser. No. 63/391,320, filed on Jul. 22, 2022. The entirety of the above-mentioned patent application is hereby incorporated by reference herein and made a part of this specification.

BACKGROUND

Technical Field

The disclosure relates to a wearable authentication system; particularly, the disclosure relates to a wearable authentication, and a ring device.

Description of Related Art

In order to bring an immersive experience to user, various technologies, such as augmented reality (AR) and virtual reality (VR), are constantly being developed. AR technology allows users to bring virtual elements to the real-world. VR technology allows users to enter a whole new virtual world to experience a different life. Wearable devices are often used to provide this kind of immersive experience.

SUMMARY

The disclosure is direct to a wearable authentication system, and a ring device, so as to perform a user authentication easily.

In this disclosure, a wearable authentication system is provided. The wearable authentication system includes a head-mounted device and a ring device. The head-mounted device includes a first network module and a camera. The first network module is configured to send an authentication request. The camera is configured to provide an image of a hand of a user. The ring device is adapted to be worn on a finger of a user. The ring device includes an inertial measurement unit, a second network module and a biometric sensor. The inertial measurement unit is configured to provide an inertial measurement value of the ring device. The second network module is configured to receive the authentication request from the first network module of the head-mounted device. The biometric sensor is configured to gather biometric information from the user based on the authentication request. The wearable authentication system is configured to track a position of the ring device based on at least one of the image and the inertial measurement value. The second network module is further configured to send authentication information based on the biometric information to the first network module and the inertial measurement value to the first network module.

In this disclosure, a ring device is provided. The ring device is adapted to be worn on a finger of a user. The ring device includes an inertial measurement unit, a network module and a biometric sensor. The inertial measurement unit is configured to provide an inertial measurement value of the ring device. The network module is configured to receive an authentication request from an external device. The biometric sensor is configured to gather biometric information from the user based on the authentication request. The network module is further configured to send authentication information based on the biometric information to the external device and the inertial measurement value to the external device for tracking a position of the ring device.

Based on the above, according to the wearable authentication and the ring device, a user authentication is performed easily.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
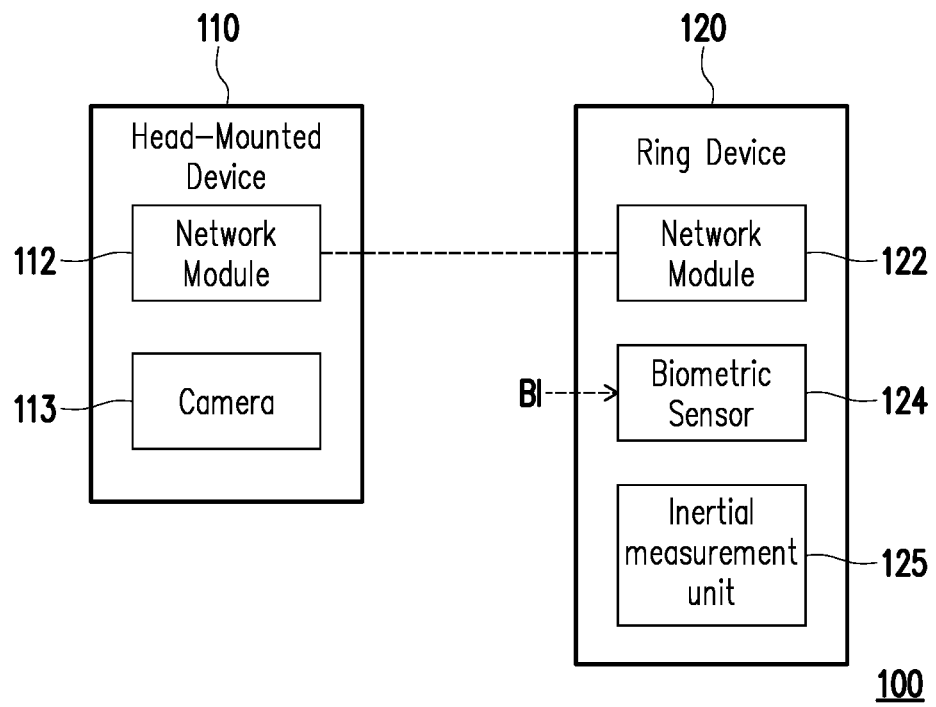
FIG. 1A is a schematic diagram of a wearable authentication system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, various technologies, such as augmented reality (AR) and virtual reality (VR), are constantly being developed. AR technology allows users to bring virtual elements to the real-world. VR technology allows users to enter a whole new virtual world to experience a different life. Wearable devices are often used to provide this kind of immersive experience.

While a user wearing a wearable device intends to perform a transaction with a user authentication, the user may enable a credit card payment and utilize an account and a password, a personal identification number (PIN) code, or iris recognition to meet the requirement. However, either traditional selecting action on a display of a smartphone or of a watch or typing in the virtual world may not be so convenient or straight forward and utilizing the account and the password for the user authentication thereby may be inefficient. Further, utilizing the PIN code the user authentication may be convenient, but the security level will be a matter of concern. Furthermore, utilizing the iris recognition may be secure and convenient, but the cost may be expensive. Hence, how to develop a convenient, secure and low-cost method for the user authentication utilizing a wearable device is becoming an issue to work on.

FIG. 1A is a schematic diagram of a wearable authentication system 100 according to an embodiment of the disclosure. With reference to FIG. 1A, the wearable authentication system 100 includes a head-mounted device 110 and a ring device 120. The head-mounted device 110 includes a network module 112 (also known as a first network module) and a camera 113. The head-mounted device 110 may be adapted to be worn on a head of a user. The camera 113 is configured to provide an image of a hand of the user. The ring device 120 includes a network module 122 (also known as a second network module), a biometric sensor 124, and an inertial measurement unit (IMU) 125. The ring device 120 may be adapted to be worn on a finger of the user. The network module 122 of the ring device 120 may be configured to communicate with the network module 112 of the head-mounted device 110. The biometric sensor 124 may be configured to gather biometric information BI from the user. The IMU 125 may be configured to provide an inertial measurement value of the ring device 120. Moreover, the wearable authentication system 100 may be configured to track a position of the ring device 120 based on at least one of the image of the camera 113 and the inertial measurement value of the IMU 125. That is, the position of the hand of the user may be determined based on either visual tracking or inertial tracking.

In one embodiment, the head-mounted device 110 may be a head-mounted display (HMD), wearable glasses (e.g., AR/VR goggles), an electronic device, other similar devices, or a combination of these devices. This disclosure is not limited thereto.

Further, the head-mounted device 110 may include a display module (not shown in FIG. 1A) and the display module includes, for example, an organic light-emitting diode (OLED) display device, a mini LED display device, a micro LED display device, a quantum dot (QD) LED display device, a liquid-crystal display (LCD) display device, a tiled display device, a foldable display device, or an electronic paper display (EPD). However, this disclosure is not limited thereto.

In one embodiment, the network module 112 or the network module 122 includes, for example, a wired network module, a wireless network module, a Bluetooth module, an infrared module, a radio frequency identification (RFID) module, a Zigbee network module, or a near field communication (NFC) network module, but the disclosure is not limited thereto. That is, the ring device 120 may be configured to communicate with the head-mounted device 110 through either wired communication or wireless communication. In one embodiment, the biometric sensor 124 includes, for example, a photoplethysmographic (PPG) sensor, a vein map sensor, a fingerprint sensor, other similar sensors, or a combination of the sensors. This disclosure is not limited thereto.

In one embodiment, the camera 113 of the head-mounted device 110 may be configured to track position and orientation of the ring device 120 worn on the user's hand with the IMU 125. Furthermore, by tracking the ring device 120 in a virtual reality (VR) or an augmented reality (AR) environment, the user may intuitively operate a selection with only one hand for performing the transaction.

In one embodiment, the IMU 125 includes, for example, a gyroscope, an accelerometer, other similar devices, or a combination of these devices. This disclosure is not limited thereto. In one embodiment, the IMU 125 may be an accelerometer and may be configured to detect at least one of three linear acceleration values in three degrees of freedom. The three linear acceleration values may include a first acceleration value along an X axis, a second acceleration value along a Y axis, and a third acceleration value along a Z axis. In one embodiment, the IMU 125 may be a gyroscope and may be configured to detect at least one of three angular velocities in three degrees of freedom (DOF). The three angular velocities may include a roll angular velocity about an X axis, a pitch angular velocity about a Y axis, and a Zyam angular velocity about a Z axis. In one embodiment, the IMU 125 may include an accelerometer and a gyroscope and configured to detect changes in six degrees of freedom. The changes in the six degrees of freedom includes the three linear acceleration values corresponding to the three perpendicular axes and the three angular velocities corresponding to three perpendicular axes (e.g., X, Y, Z axes). That is, the inertial measurement value includes, for example, at least one of the three linear acceleration value and the three angular velocities. However, this disclosure is not limited thereto.

It is noted that, while a user wearing the head-mounted device 110 and the ring device 120 device intends to perform a user authentication, the network module 122 of the ring device 120 may be configured to receive an authentication request from the network module 112 of the head-mounted device 110 (as known as an external device). Based on the authentication request, the biometric sensor 124 of the ring device 120 may be configured to gather biometric information BI (e.g., blood flow, vein distribution, or fingerprint). Moreover, the network module 122 may be further configured to send authentication information based on the biometric information BI to the network module 112 of head-mounted device 110. In one embodiment, the authentication information may include information of the user gathered by the biometric sensor 124 of the ring device 120. In another embodiment, the authentication information may include an authentication result and the authentication result may be configured to indicate a user authentication succeeds or fails. In other words, this disclosure does not limit what is included in the authentication information. In this manner, the wearable authentication system 100 is able to determine a user authentication succeeds or fails based on the authentication information. Therefore, a convenient, secure and low-cost method for a user authentication utilizing the ring device 120 and the head-mounted device 110 is achieved.

Figures 1B, 1C:
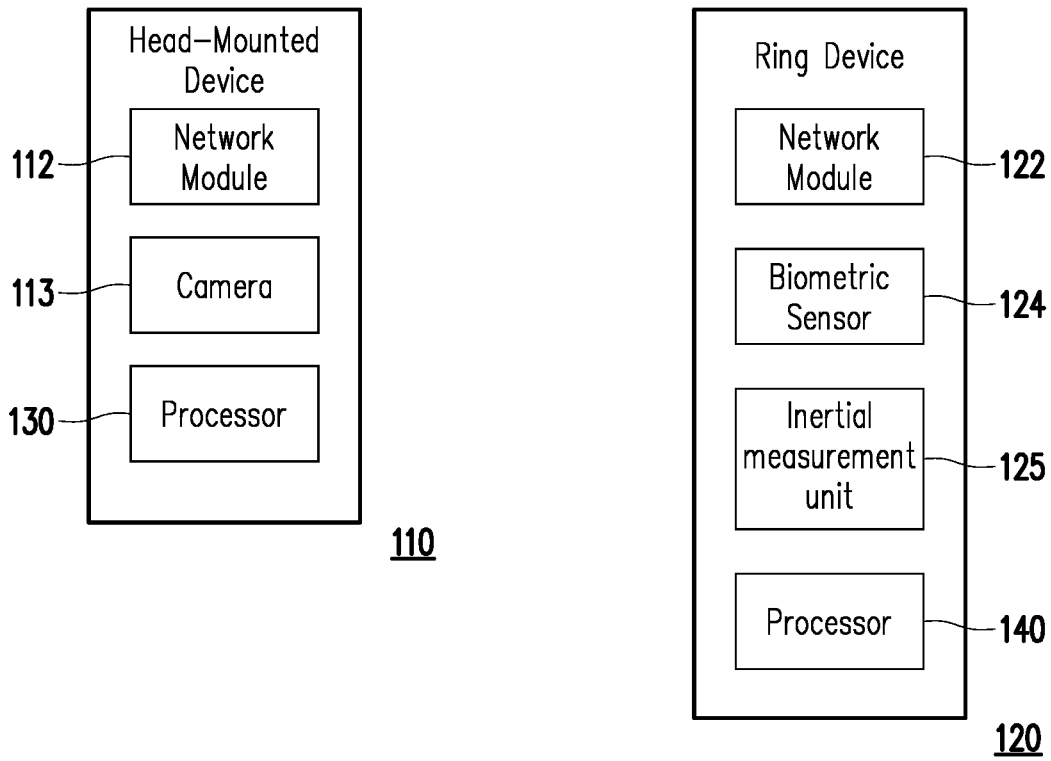
FIG. 1B is a schematic diagram of a head-mounted device according to an embodiment of the disclosure.
FIG. 1C is a schematic diagram of a ring device according to an embodiment of the disclosure.

FIG. 1B is a schematic diagram of a head-mounted device 110 according to an embodiment of the disclosure. FIG. 1C is a schematic diagram of a ring device 120 according to an embodiment of the disclosure. With reference to FIG. 1A, FIG. 1B and FIG. 1C, FIG. 1B depicts an embodiment of the head-mounted device 110 including a processor 130 and FIG. 1C depicts an embodiment of the ring device 120 including a processor 140.

In one embodiment, the processor 130 or the processor 140 includes, for example, a microcontroller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the processor 130 or the processor 140 may be achieved as multiple program codes. The program codes are stored in a memory, and executed by the processor 130 or the processor 140. Alternatively, in an embodiment, each of the functions of the processor 130 or the processor 140 may be achieved as one or more circuits. The disclosure does not limit the use of software or hardware to achieve the functions of the processor 130 or the processor 140.

Referring to FIG. 1B first, in one embodiment, the head-mounted device 110 may further include the processor 130 (also known as a first processor). The network module 112 of the head-mounted device 110 may be configured to receive the authentication information from the ring device 120. The authentication information may include the biometric information BI gathered by the biometric sensor 124 of the ring deice 120. That is, the biometric information BI may be comprised in the authentication information.

Further, the processor 130 may be configured to generate an authentication result based on the biometric information BI. For example, a memory (also known as a first memory) of the head-mounted device 110 may be configured to pre-store default biometric information of the user. The processor 130 may be configured to compare the biometric information BI with the default biometric information to determine a user authentication succeeds or fails. In other words, the user authentication may be configured to be performed on the head-mounted device 110.

Furthermore, the processor 130 may be configured to track a position of the ring device 110 based on at least one of the image of the camera 113 and the inertial measurement value of the IMU 125. In addition, the processor 130 may be configured to determine a virtual position of a virtual hand in the virtual world based on the position of the ring device 110 in the real word. Therefore, a virtual action (or an intention) of the user in the virtual world may be determined based on the virtual position. That is, the user may only need to use one hand to perform all the actions required for the virtual action or for the user authentication, thereby increasing the user experience.

In this manner, the wearable authentication system 100 is able to determine a user authentication succeeds or fails based on the authentication information. Therefore, a convenient, secure and low-cost method for a user authentication utilizing the ring device 120 and the head-mounted device 110 is achieved.

Referring to FIG. 1C now, in one embodiment, the ring device 120 may further include the processor 140 (also known as a second processor). The processor 140 of the ring device 120 may be configured to receive the biometric information BI from the biometric sensor 124 of the ring device 120 and generate an authentication result based on the biometric information BI. For example, a memory (also known as a second memory) of the ring device 120 may be configured to pre-store default biometric information of the user. The processor 140 may be configured to compare the biometric information BI with the default biometric information to determine a user authentication succeeds or fails. The authentication result may be included in the authentication information. That is, the authentication information may include the authentication result. In other words, the user authentication may be configured to be performed on the ring device 120.

Further, the processor 140 may be configured to output the authentication result of the user authentication as the authentication information and the network module 122 of the ring device 120 may be configured to send the authentication information (including the authentication result) to the network module 112 of the head-mounted device 110.

Furthermore, the processor 140 may be configured to track a position of the ring device 110 based on at least one of the image of the camera 113 and the inertial measurement value of the IMU 125. In addition, the processor 140 may be configured to determine a virtual position of a virtual hand in the virtual world based on the position of the ring device 110 in the real word. Therefore, a virtual action (or an intention) of the user in the virtual world may be determined based on the virtual position. That is, the user may only need to use one hand to perform all the actions required for the virtual action or for the user authentication, thereby increasing the user experience.

In this manner, the wearable authentication system 100 is able to determine a user authentication succeeds or fails based on the authentication information. Therefore, a convenient, secure and low cost method for a user authentication utilizing the ring device 120 and the head-mounted device 110 is achieved.

Figure 2A:
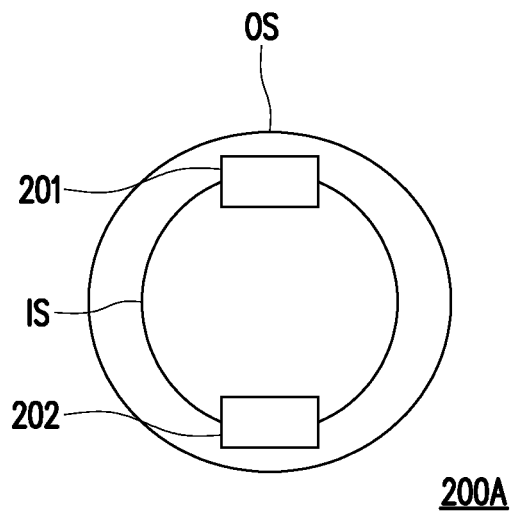
FIG. 2A is a schematic diagram of a ring device with a photoplethysmographic (PPG) sensor according to an embodiment of the disclosure.
Figure 2B:
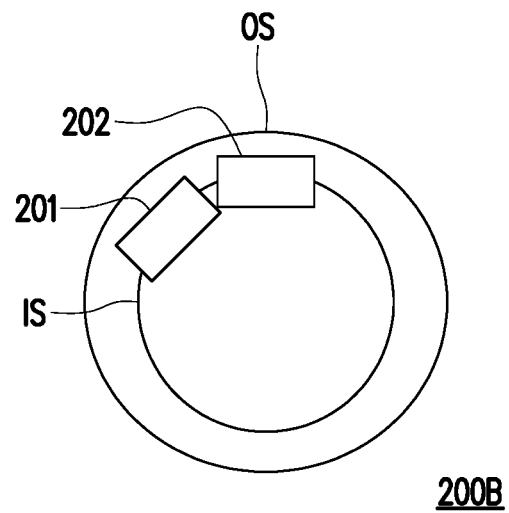
FIG. 2B is a schematic diagram of a ring device with a photoplethysmographic (PPG) sensor according to an embodiment of the disclosure.
Figure 2C:
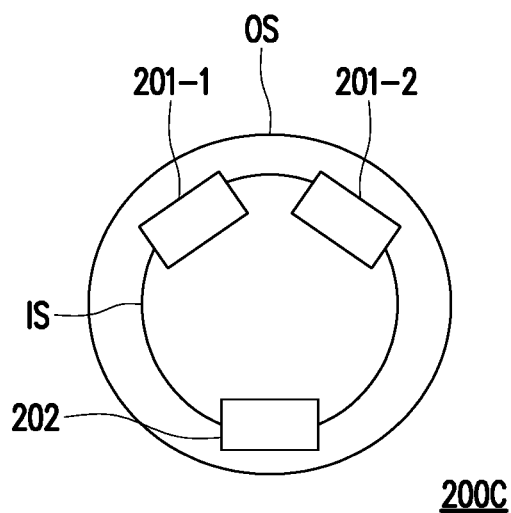
FIG. 2C is a schematic diagram of a ring device with a photoplethysmographic (PPG) sensor according to an embodiment of the disclosure.
Figure 2D:
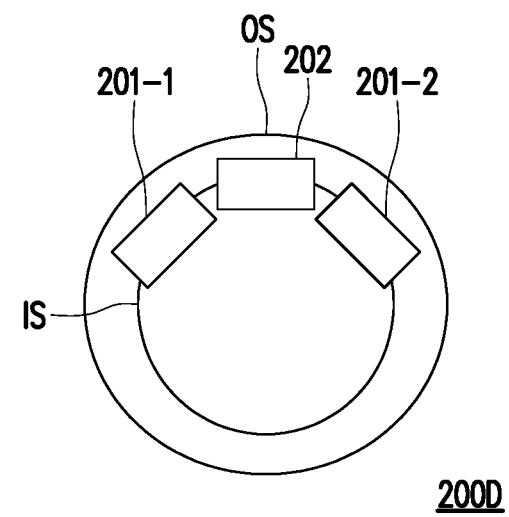
FIG. 2D is a schematic diagram of a ring device with a photoplethysmographic (PPG) sensor according to an embodiment of the disclosure.

FIG. 2A is a schematic diagram of a ring device 200A with a PPG sensor according to an embodiment of the disclosure. FIG. 2B is a schematic diagram of a ring device 200B with a PPG sensor according to an embodiment of the disclosure. FIG. 2C is a schematic diagram of a ring device 200C with a PPG sensor according to an embodiment of the disclosure. FIG. 2D is a schematic diagram of a ring device 200D with a PPG sensor according to an embodiment of the disclosure. With reference to FIG. 1A to FIG. 2D, each of FIG. 2A to FIG. 2D depicts a ring device 120 of FIG. 1A with a PPG sensor and the PPG sensor is disposed on the ring device 120 with a specific arrangement. The details of the ring devices 200A, 200B, 200C, 200D may be referred to the descriptions of the ring device 120 in FIG. 1A to obtain sufficient teachings, suggestions, and implementation embodiments, while the details are not redundantly described seriatim herein.

In one embodiment, the biometric sensor 124 of the ring devices 120 may include a PPG sensor and the PPG sensor may include a light emitting diode (LED) and a photodiode. The LED may be configured to emit a sensor light towards the finger. The photodiode may be configured to receive the sensor light and generate blood flow information based on the sensor light. Furthermore, the photodiode may be configured to output the blood flow information as the biometric information BI.

In one embodiment, the photodiode may be configured to receive the sensor light which is transmitted through the finger of the user. That is, the PPG sensor may be a transmission PPG sensor. In another embodiment, the photodiode may be configured to receive the sensor light which is reflected from the finger of the user. That is, the PPG sensor may be a reflection PPG sensor. This disclosure does not limit the type of the PPG sensor.

In one embodiment, the PPG sensor may comprise one LED and a photodiode. That is, the PPG sensor may be a single LED PPG sensor. In one embodiment, the PPG sensor may comprise more than one LEDs and a photodiode. That is, the PPG sensor may be a multiple LED PPG sensor. This disclosure does not limit the number of the LED of the PPG sensor.

Referring to FIG. 2A, a ring device 200A may include an outer surface OS and an inner surface IS. A LED 201 and a photodiode 202 may be disposed on the inner surface IS. Further, the photodiode 202 may be disposed in a direction facing to the LED 201, so that the photodiode 202 may be configured to receive the sensor light which is transmitted through the finger of the user. That is, the PPG sensor may be a single LED transmission PPG sensor.

Referring to FIG. 2B, a ring device 200B may include an outer surface OS and an inner surface IS. A LED 201 and a photodiode 202 may be disposed on the inner surface IS. Further, the photodiode 202 may be disposed in a position adjacent to the LED 201, so that the photodiode 202 may be configured to receive the sensor light which is reflected from the finger of the user. That is, the PPG sensor may be a single LED reflection PPG sensor.

Referring to FIG. 2C, a ring device 200C may include an outer surface OS and an inner surface IS. Two LEDs 201-1, 201-2 and a photodiode 202 may be disposed on the inner surface IS. Further, the photodiode 202 may be disposed in a direction facing to the two LEDs 201-1, 201-2, so that the photodiode 202 may be configured to receive the sensor light which is transmitted through the finger of the user. That is, the PPG sensor may be a multiple LED transmission PPG sensor.

Referring to FIG. 2D, a ring device 200D may include an outer surface OS and an inner surface IS. Two LEDs 201-1, 201-2 and a photodiode 202 may be disposed on the inner surface IS. Further, the photodiode 202 may be disposed in a position adjacent to the two LEDs 201-1, 201-2, so that the photodiode 202 may be configured to receive the sensor light which is reflected from the finger of the user. That is, the PPG sensor may be a multiple LED reflection PPG sensor.

It is noted that, since the blood flow of a finger is different from one user to another user, the blood flow information gathered by the PPG sensor may be configured to perform a user authentication. That is, the biometric information BI may include the blood flow information. Further, default blood flow information of the user may be pre-stored in the head-mounted device 110 or the ring device 120. Furthermore, the head-mounted device 110 or the ring device 120 may be configured to compare the blood flow information with the default blood flow information to determine a user authentication succeeds or fails.

In this manner, the wearable authentication system 100 is able to determine a user authentication succeeds or fails based on the authentication information. Therefore, a convenient, secure and low cost method for a user authentication utilizing the ring device 120 and the head-mounted device 110 is achieved.

Figure 3A:
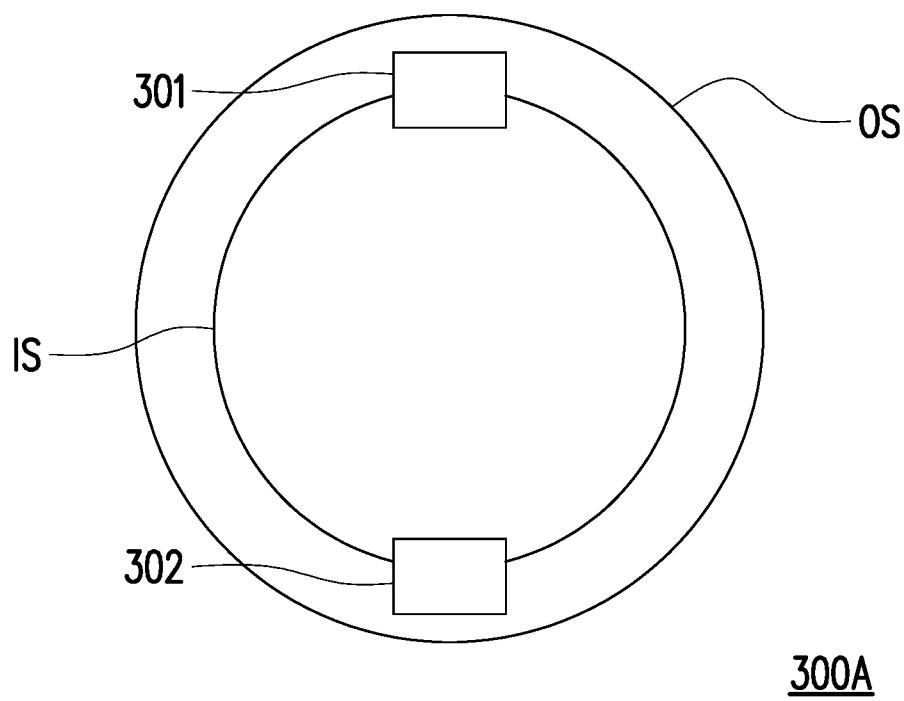
FIG. 3A is a schematic diagram of a cross-section in a first direction of a ring device with a vein map sensor according to an embodiment of the disclosure.
Figure 3B:
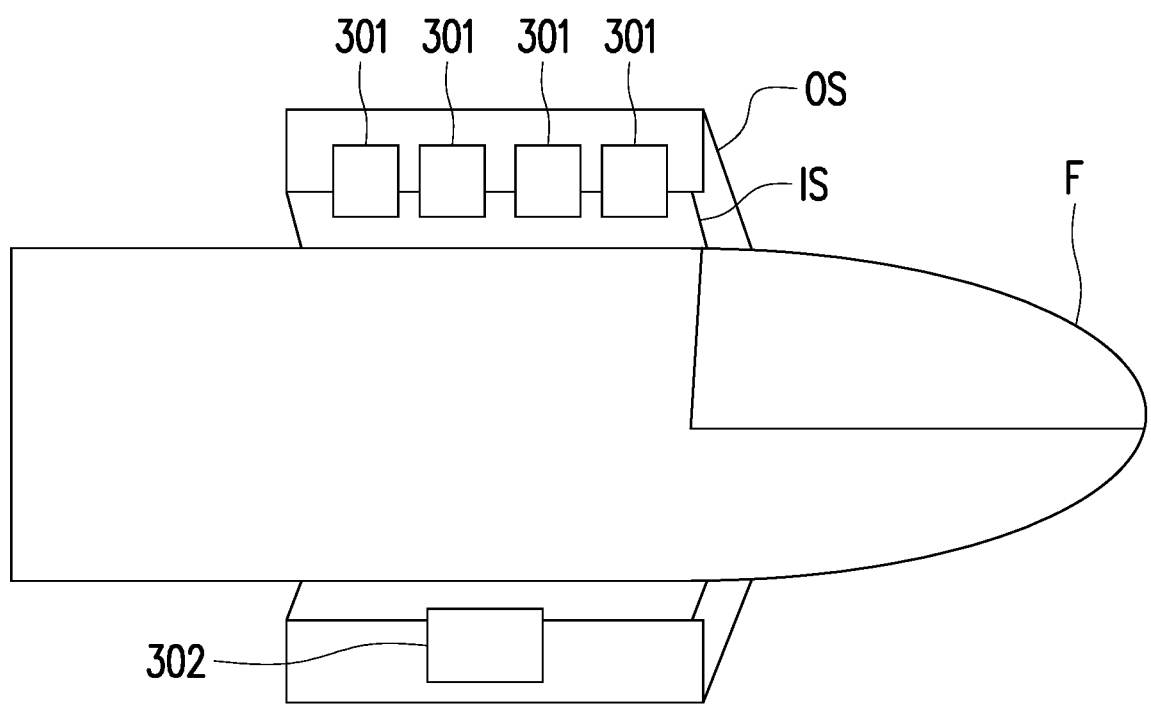
FIG. 3B is a schematic diagram of a cross-section in a second direction perpendicular to the first direction of a ring device with a vein map sensor according to an embodiment of the disclosure.

FIG. 3A is a schematic diagram of a cross-section in a first direction of a ring device with a vein map sensor according to an embodiment of the disclosure. FIG. 3B is a schematic diagram of a cross-section in a second direction perpendicular to the first direction of a ring device with a vein map sensor according to an embodiment of the disclosure. With reference to FIG. 1A, FIG. 3A and FIG. 3B, each of FIG. 3A and FIG. 3B depicts a ring device 120 of FIG. 1A with a vein map sensor and the PPG sensor is disposed on the ring device 120 with a specific arrangement.

Referring to FIG. 3A, the biometric sensor 124 of the ring device 300A may include a vein map sensor and the vein map sensor may include a plurality of intra-red light emitting diodes (LEDs) 301 and an infra-red camera 302. Each of the plurality of infra-red LEDs 301 may be configured to emit an infra-red light towards the finger. The infra-red camera 302 may be configured to receive the infra-red light and generate vein map information based on the infra-red light. Further, the infra-red camera 302 may be configured to output vein map information as the biometric information BI.

Further, the ring device 300A may include an outer surface OS and an inner surface IS. The plurality of intra-red LEDs 301 and the infra-red camera 302 may be disposed on the inner surface IS. The infra-red camera 302 may be disposed facing the plurality of infra-red LEDs 301, so that the infra-red camera 302 may be configured to receive the infra-red light which is transmitted through the finger of the user.

Referring to FIG. 3B, in one embodiment, in the second direction perpendicular to the first direction, the plurality of infra-red LEDs 301 may be disposed parallel to a surface of a finger F of the user. The surface of the finger F may be parallel to an axis of the finger F, but this disclosure is not limited thereto. Therefore, while the infra-red light from each ach of the plurality of infra-red LEDs 301 is received by the infra-red camera 302, the vein map information include a vein map of the finger F of the user may be generated.

It is noted that, since the vein map of a finger is different from one user to another user, the vein map information gathered by the vein map sensor may be configured to perform a user authentication. That is, the biometric information BI may include the vein map information. Further, default vein map information of the user may be pre-stored in the head-mounted device 110 or the ring device 120. Furthermore, the head-mounted device 110 or the ring device 120 may be configured to compare the vein map information with the default vein map information to determine a user authentication succeeds or fails.

In this manner, the wearable authentication system 100 is able to determine a user authentication succeeds or fails based on the authentication information. Therefore, a convenient, secure and low cost method for a user authentication utilizing the ring device 120 and the head-mounted device 110 is achieved.

Figure 4:
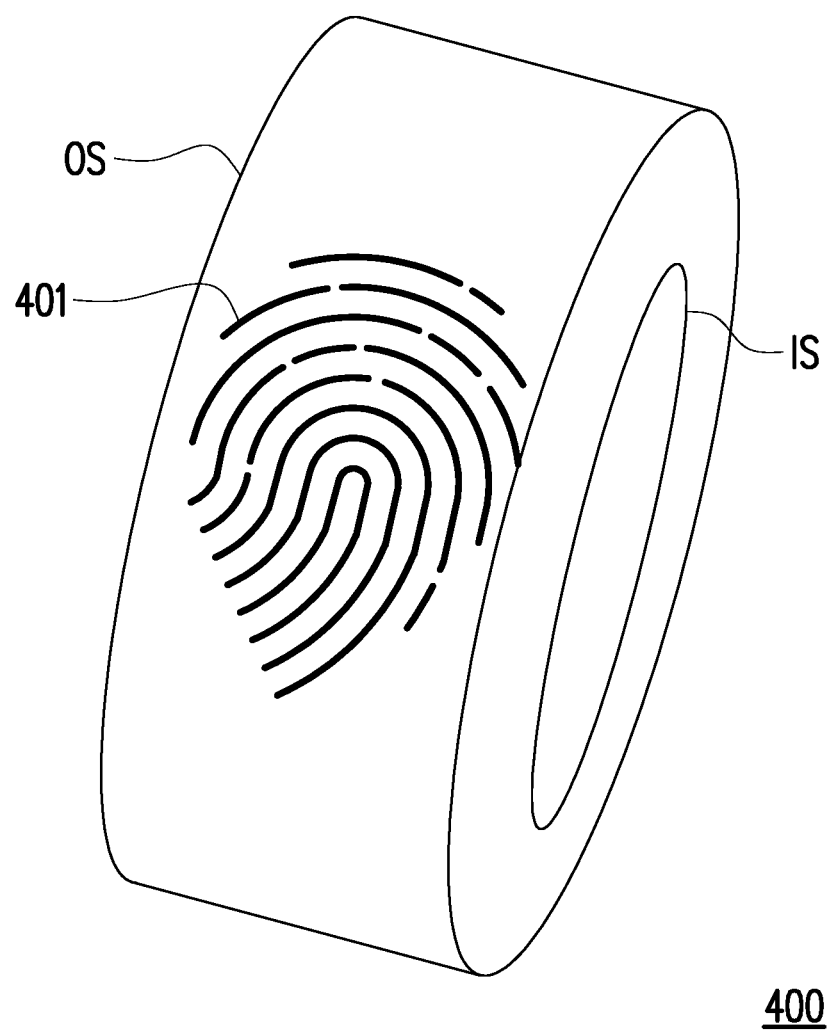
FIG. 4 is a schematic diagram of a ring device with a fingerprint sensor according to an embodiment of the disclosure.

FIG. 4 is a schematic diagram of a ring device 400 with a fingerprint sensor according to an embodiment of the disclosure. The details of the ring device 400 may be referred to the descriptions of the ring device 120 in FIG. 1A to obtain sufficient teachings, suggestions, and implementation embodiments, while the details are not redundantly described seriatim herein.

Referring to FIG. 4, the biometric sensor 124 of the ring device 400 may include a fingerprint sensor 401. The fingerprint sensor 401 may be configured to obtain a fingerprint of a checking finger (e.g., another finger) of the user and output fingerprint information as the biometric information BI. In one embodiment, the ring device 400 may include an outer surface OS of the ring device 400, so that the fingerprint sensor 401 may be configured to receive the fingerprint of the checking finger while the checking finger touches the outer surface OS of the ring device 400.

It is noted that, since the fingerprint of a finger is different from one user to another user, the fingerprint information gathered by the fingerprint sensor 401 may be configured to perform a user authentication. That is, the biometric information BI may include the fingerprint information. Further, default fingerprint information of the user may be pre-stored in the head-mounted device 110 or the ring device 120. Furthermore, the head-mounted device 110 or the ring device 120 may be configured to compare the fingerprint information with the default fingerprint information to determine a user authentication succeeds or fails.

In this manner, the wearable authentication system 100 is able to determine a user authentication succeeds or fails based on the authentication information. Therefore, a convenient, secure and low cost method for a user authentication utilizing the ring device 120 and the head-mounted device 110 is achieved.

Figure 5:
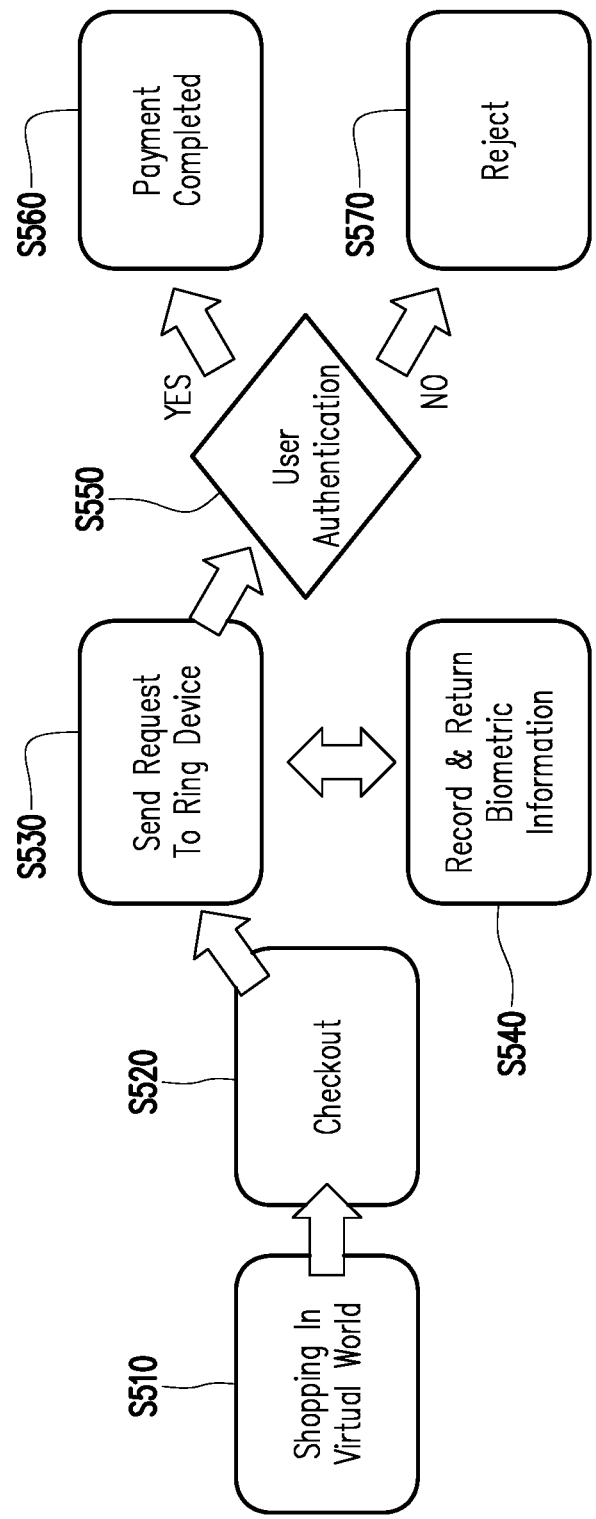
FIG. 5 is a schematic flowchart of an authentication method in a virtual world according to an embodiment of the disclosure.

FIG. 5 is a schematic flowchart of an authentication method in a virtual world according to an embodiment of the disclosure. With reference to FIG. 1A and FIG. 5, a virtual may be displayed by the head-mounted device 110. An authentication method in the virtual world may include following steps, but this disclosure does not limit thereto.

In a step S510, a user may go shopping in the virtual world. For example, the user may browse a shopping website in the virtual world or enter a virtual store in the virtual world. In one embodiment, the processor 130 or the processor 140 may be configured to determine a virtual action of the user in the virtual world based on the position of the ring device 120 in the real word.

In a step S520, the user may decide what to buy and perform a checkout process. In response to the checkout process, the shopping web site or the virtual store may send a checkout request of the shopping to the head-mounted device 110. In one embodiment, the processor 130 or the processor 140 may be configured to determine the checkout request according to a selection in the virtual world based on the position of the ring device 120.

In a step S530, in response to the checkout request, the head-mounted device 110 may send a request (e.g., the authentication request) to the ring device 120 for a user authentication for the checkout. In a step S540, in response to the request, the biometric sensor 124 of the ring device 120 may record biometric information BI of the user and the network module 122 of the ring device 120 may send (return) the biometric information BI to the head-mounted device 120.

In a step S550, the user authentication for the checkout may be performed based on the biometric information BI. In a step S560, in response to the user authentication being successful, a payment of the checkout may be completed. For example, the head-mounted device 110 may provide a credit card number or a device account number (DAN) representing the credit card number to the shopping website or the virtual store. In a step S570, in response to the user authentication being failed, the checkout may be rejected.

In this manner, the wearable authentication system 100 is able to perform a user authentication for a shopping in the virtual world. Therefore, a convenient, secure and low cost method for a user authentication utilizing the ring device 120 and the head-mounted device 110 is achieved.

Figure 6A:
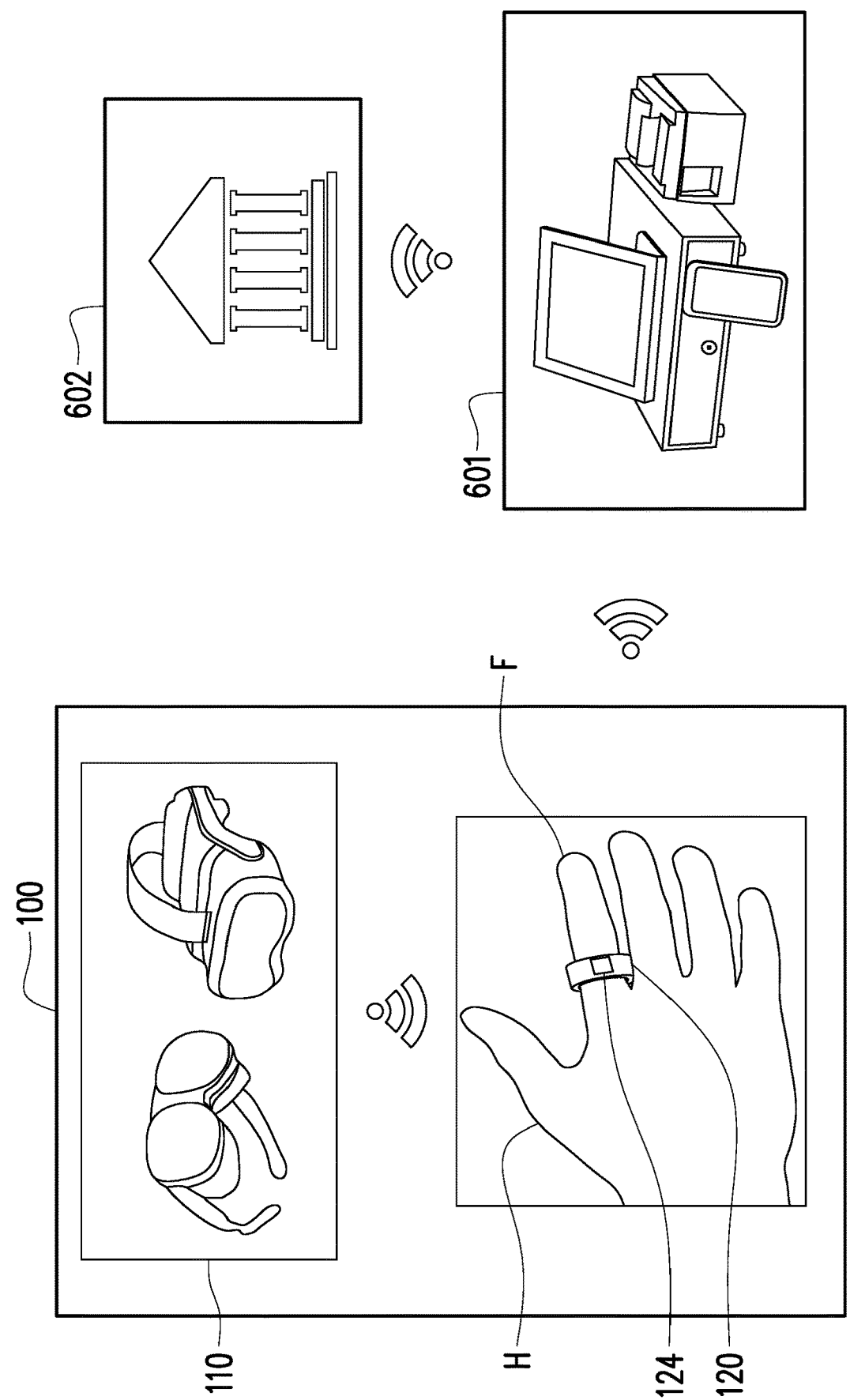
FIG. 6A is a schematic diagram of an authentication scenario in a real world according to an embodiment of the disclosure.
Figure 6B:
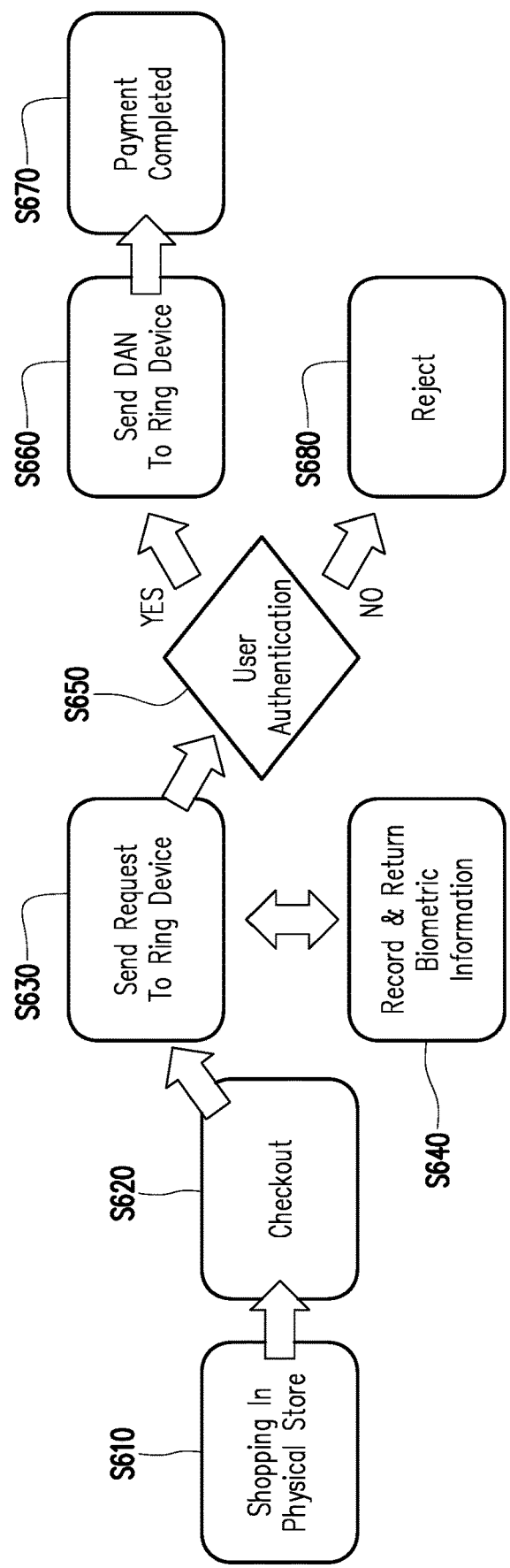
FIG. 6B is a schematic flowchart of an authentication method in a real world according to an embodiment of the disclosure.

FIG. 6A is a schematic diagram of an authentication scenario in a real world according to an embodiment of the disclosure. FIG. 6B is a schematic flowchart of an authentication method in a real world according to an embodiment of the disclosure.

With reference to FIG. 1A and FIG. 6A, an authentication scenario in a real world may include the wearable authentication system 100, a point of sale (POS) machine, and a bank 602.

The wearable authentication system 100 may include the head-mounted device 110 and the ring device 120 with the biometric sensor 124. The ring device 120 may be worn on a finger F of a hand H of a user. In response to a check out process in the real world, the wearable authentication system 100, the point of sale (POS) machine, and the bank 602 may be configured to communicate with each other through wired communication or wireless communication. An exemplary embodiment an authentication method for the authentication scenario in the real world of is depicted in FIG. 6B, but this disclosure does not limit thereto.

In a step 5610, a user may go shopping in the real world. For example, the user may enter a physical store. In a step 5620, the user may decide what to buy and perform a checkout process. In response to the checkout process, the physical store may request a payment from the user.

In a step 5630, in response to the payment, the user may operation the head-mounted device 110 to send a request (e.g., the authentication request) to the ring device 120 for a user authentication for the payment. In a step 5640, in response to the request, the biometric sensor 124 of the ring device 120 may record biometric information BI of the user and the network module 122 of the ring device 120 may send (return) the biometric information BI to the head-mounted device 120.

In a step 5650, the user authentication for the payment may be performed based on the biometric information BI. In a step 5660, in response to the user authentication being successful, a payment of the checkout may be completed. For example, the network module 122 of the ring device 120 may include a near-field communication (NFC) module. In response to the user authentication based on the biometric information BI being successful, a credit card number or a device account number (DAN) representing the credit card number may be sent to the NFC module of the ring device 120. In a step 5670, the user may bring the ring device 120 close to the POS machine 601, so that the NFC module may provide a credit card number or a device account number (DAN) representing the credit card number to the POS machine 601 to complete the payment. In a step 5680, in response to the user authentication being failed, the checkout may be rejected.

In this manner, the wearable authentication system 100 is able to perform a user authentication for a shopping in the real world. Therefore, a convenient, secure and low cost method for a user authentication utilizing the ring device 120 and the head-mounted device 110 is achieved.

It is noted that, the ring device 120 may further include a status LED. The status LED may be configured to indicate a status of the ring device. In one embodiment, in response to the biometric sensor 124 being gathering the biometric information BI from the user, the status LED, the status LED may be configured to display a blue light. In another embodiment, in response to the user authentication being successful, the status LED may be configured to display a green light. In yet another embodiment, in response to the user authentication being failed, the status LED may be configured to display a red light. Therefore, the user may easily understand the status of the ring device 120 (as well as the status of the user authentication) without checking the head-mounted device 110.

Further, the ring device 120 may further include a button. The button of the ring device 120 may be configured to gather input from the user. For example, the button may include a touch area and the touch area is configured to detect a touch from the user. Therefore, the user may be able to perform a selection or confirmation in response to information display by the head-mounted device 110.

Figure 7:
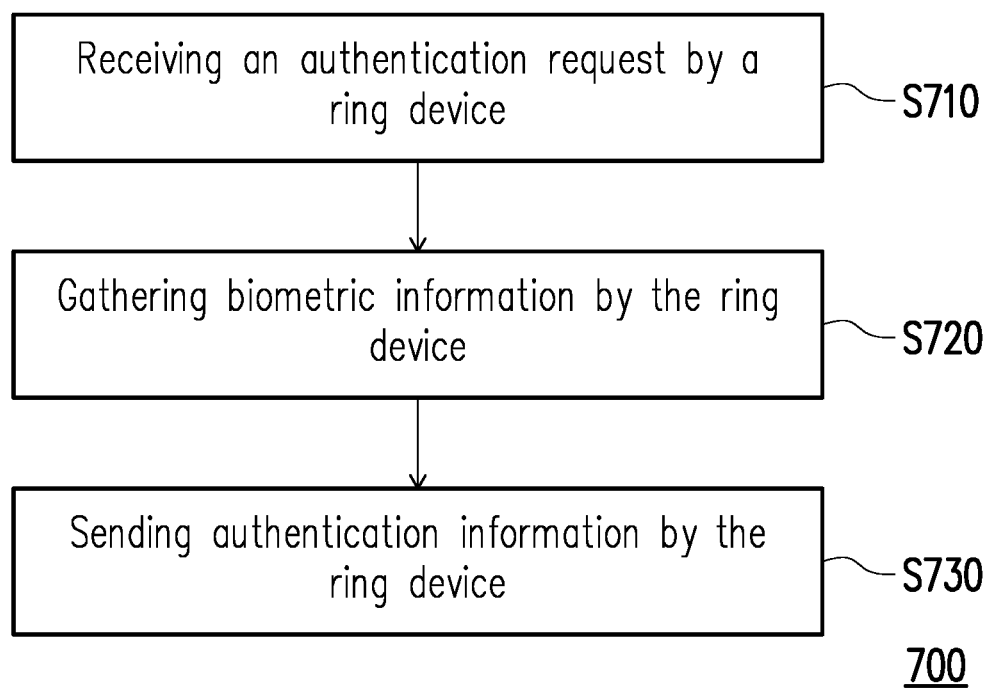
FIG. 7 is a schematic flowchart of an authentication method according to an embodiment of the disclosure.

FIG. 7 is a schematic flowchart of an authentication method 700 according to an embodiment of the disclosure. With reference to FIG. 1A and FIG. 7, the authentication method 700 includes a step S710, a step S720, and a step S730.

In the step S710, the ring device 120 may be configured to receive an authentication request. In the step S720, the ring device 120 may be configured to gather biometric information BI. In the step S730, the ring device 120 may be configured to send authentication information. It is noted that, the implementation details of the authentication method 700 may be referred to the descriptions of FIG. 1A to FIG. 6B to obtain sufficient teachings, suggestions, and implementation embodiments, while the details are not redundantly described seriatim herein.

In this manner, the authentication method 700 is able to determine a user authentication succeeds or fails based on the authentication information. Therefore, a convenient, secure and low cost method for a user authentication utilizing the authentication method 700 is achieved.

In summary, according to the ring device 120, the wearable authentication system 110, and the authentication method 700, based on biometric information BI gathered by the biometric sensor 124 of the ring device, a user authentication may be performed conveniently, securely and with low cost.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A wearable authentication system, comprising:
    a head-mounted device, comprising:
        a first network module, configured to send an authentication request; and
        a camera, configured to provide an image of a hand of a user;
    a ring device, adapted to be worn on a finger of the user, wherein the ring device comprises:
        an inertial measurement unit, configured to provide an inertial measurement value of the ring device;
        a second network module, wherein the second network module is configured to receive the authentication request from the first network module of the head-mounted device; and
        a biometric sensor, configured to gather biometric information from the user based on the authentication request,
    wherein the wearable authentication system is configured to track a position of the ring device based on at least one of the image and the inertial measurement value, and
    the second network module is further configured to send authentication information based on the biometric information to the first network module and the inertial measurement value to the first network module,
    wherein the first network module of the head-mounted device is configured to send the authentication request in response to a checkout request of a shopping in a virtual world displayed by the head-mounted device, and
    the checkout request is determined according to a selection in the virtual world based on the position of the ring device.

2. The wearable authentication system according to claim 1, wherein the biometric sensor comprises:
    a photoplethysmographic sensor, comprising a light emitting diode and a photodiode, wherein the light emitting diode is configured to emit a sensor light towards the finger and the photodiode is configured to receive the sensor light and output blood flow information as the biometric information.

3. The wearable authentication system according to claim 1, wherein the biometric sensor comprises:
    a vein map sensor, comprising a plurality of infra-red light emitting diodes and an infra-red camera, wherein each of the plurality of infra-red light emitting diodes is configured to emit an infra-red light towards the finger and the photodiode is configured to receive the infra-red light and output vein map information as the biometric information.

4. The wearable authentication system according to claim 1, wherein the biometric sensor comprises:
    a fingerprint sensor, configured to obtain a fingerprint of a checking finger of the user and output fingerprint information as the biometric information.

5. The wearable authentication system according to claim 1, wherein the network module comprises:
    a near-field communication network module, configured to, in response to a user authentication based on the biometric information being successful, send a credit card number of the user or a device account number representing the credit card number of the user to a point of sale machine based on the authentication information.

6. The wearable authentication system according to claim 1, wherein the ring device further comprises:
   a status light emitting diode, configured to indicate a status of the ring device.

7. The wearable authentication system according to claim 1, wherein the ring device further comprises:
   a button, configured to gather input from the user.

8. The wearable authentication system according to claim 1, wherein the biometric information is comprised in the authentication information, the head-mounted device further comprises:
   a processor, configured to:
      generate an authentication result by comparing the biometric information with default biometric information of the user pre-stored in the head-mounted device.

9. The wearable authentication system according to claim 1, wherein the authentication information comprises an authentication result and the ring device further comprises:
   a processor, configured to:
      generate the authentication result by comparing the biometric information with default biometric information of the user pre-stored in the ring device.

10. A ring device, adapted to be worn on a finger of a user, wherein the ring device comprises:
    an inertial measurement unit, configured to provide an inertial measurement value of the ring device;
    a network module, wherein the network module is configured to receive an authentication request from an external device; and
    a biometric sensor, configured to gather biometric information from the user based on the authentication request,
    wherein the network module is further configured to send authentication information based on the biometric information to the external device and the inertial measurement value to the external device for tracking a position of the ring device,
    wherein the external device is configured to send the authentication request in response to a checkout request of a shopping in a virtual world displayed by the external device, and
    the checkout request is determined according to a selection in the virtual world based on the position of the ring device.

11. The ring device according to claim 10, wherein the biometric sensor comprises:
    a photoplethysmographic sensor, comprising a light emitting diode and a photodiode, wherein the light emitting diode is configured to emit a sensor light towards the finger and the photodiode is configured to receive the sensor light and output blood flow information as the biometric information.

12. The ring device according to claim 10, wherein the biometric sensor comprises:
    a vein map sensor, comprising a plurality of infra-red light emitting diodes and an infra-red camera, wherein each of the plurality of infra-red light emitting diodes is configured to emit an infra-red light towards the finger and the photodiode is configured to receive the infra-red light and output vein map information as the biometric information.

13. The ring device according to claim 10, wherein the biometric sensor comprises:
    a fingerprint sensor, configured to obtain a fingerprint of a checking finger of the user and output fingerprint information as the biometric information.

14. The ring device according to claim 10, wherein the network module comprises:
    a near-field communication network module, configured to, in response to a user authentication based on the biometric information being successful, send a credit card number of the user or a device account number representing the credit card number of the user to a point of sale machine based on the authentication information.

15. The ring device according to claim 10, wherein the ring device further comprises:
    a status light emitting diode, configured to indicate a status of the ring device.

16. The ring device according to claim 10, wherein the ring device further comprises:
    a button, configured to gather input from the user.

17. The ring device according to claim 10, wherein the biometric information is comprised in the authentication information, the external device further comprises:
    a processor, configured to:
       generate an authentication result by comparing the biometric information with default biometric information of the user pre-stored in the external device.

18. The ring device according to claim 10, wherein the authentication information comprises an authentication result and the ring device further comprises:
    a processor, configured to:
       generate the authentication result by comparing the biometric information with default biometric information of the user pre-stored in the ring device.

* * * * *